(12) United States Patent
Tran

(10) Patent No.: US 7,160,062 B2
(45) Date of Patent: Jan. 9, 2007

(54) MILLING CUTTER

(75) Inventor: Toan Dat Tran, 10300 Harwin Dr., #805, Houston, TX (US) 77036

(73) Assignee: Toan Dat Tran, Houston, TX (US)

( * ) Notice: Subject to any disclaimer, the term of this patent is extended or adjusted under 35 U.S.C. 154(b) by 113 days.

(21) Appl. No.: 10/755,178

(22) Filed: Jan. 12, 2004

(65) Prior Publication Data

US 2005/0152752 A1    Jul. 14, 2005

(51) Int. Cl.
*B23C 5/28* (2006.01)
(52) U.S. Cl. .............................. 407/34; 407/69; 407/53
(58) Field of Classification Search .................. 407/34, 407/35, 67, 69, 53, 70, 101, 102, 99
See application file for complete search history.

(56) References Cited

U.S. PATENT DOCUMENTS

| | | | |
|---|---|---|---|
| 6,220,794 B1* | 4/2001 | Calamia et al. ............... | 407/40 |
| 6,450,738 B1* | 9/2002 | Ripley .......................... | 407/35 |
| 6,595,727 B1* | 7/2003 | Arvidsson .................... | 407/35 |
| 6,604,894 B1* | 8/2003 | Noggle ........................ | 407/35 |

FOREIGN PATENT DOCUMENTS

JP       2000094211 A   *   4/2000

* cited by examiner

*Primary Examiner*—Willmon Fridie, Jr.

(57) ABSTRACT

A milling cutter with two faces of cutting end and two mirror symmetrical central bores for the mounting in a shell mill holder on either one of them. The aligned key grooves are formed on the bottom surface of each central bore. The inserts are located on the periphery of each cutting end.

2 Claims, 3 Drawing Sheets

MILLING CUTTER

FIELD OF THE INVENTION

The present invention relates to a cutting tool with two faces of working end and with the possibility to turn in clockwise or counter clockwise direction in respect to its central axis.

BACKGROUND OF THE INVENTION

Basically a milling cutter has one cutting face at the front side and one coupling face at the back side generally with a through cut channel as showed U.S. Pat. No. 6,540,448 B2 to interlock into a shell mill holder. In this conventional design of milling cutter with indexable inserts the spindle turns in one unique well defined direction. More over the inserts used in such a milling cutter expose only a small portion of a cutting edge to the workpiece during the operation. For instance a square-like insert with half inch I.C wears off on the right lower side up to a certain depth cut while milling a workpiece. It is possible to use the left lower side of the insert with another milling cutter turning in another direction of spindle. The idea is to use the insert to its 100% utility for environmental and economical reasons.

Thus, there is a need to design a single milling cutter which can achieve this goal with a simple and unique body. Such a cutting tool would be less expensive than one set of two tools.

SUMMARY OF THE INVENTION

It is an object of the invention to provide an unique milling cutter which can use e.g. the Square-like inserts to their full utility.

It is still another object of the invention to improve the cooling capability for the inserts, for the workpiece and for milling cutter itself.

In one form thereof, the invention is milling cutter to machine smooth surfaces that comprises two milling heads rotatable about a same central axis of their common body.

In another special form thereof, the invention presents four holes drilled through inside the body for central inner coolant from the retention knob to the workpiece.

DETAILED DESCRIPTION OF PREFERRED EMBODIMENTS

Figure 1:
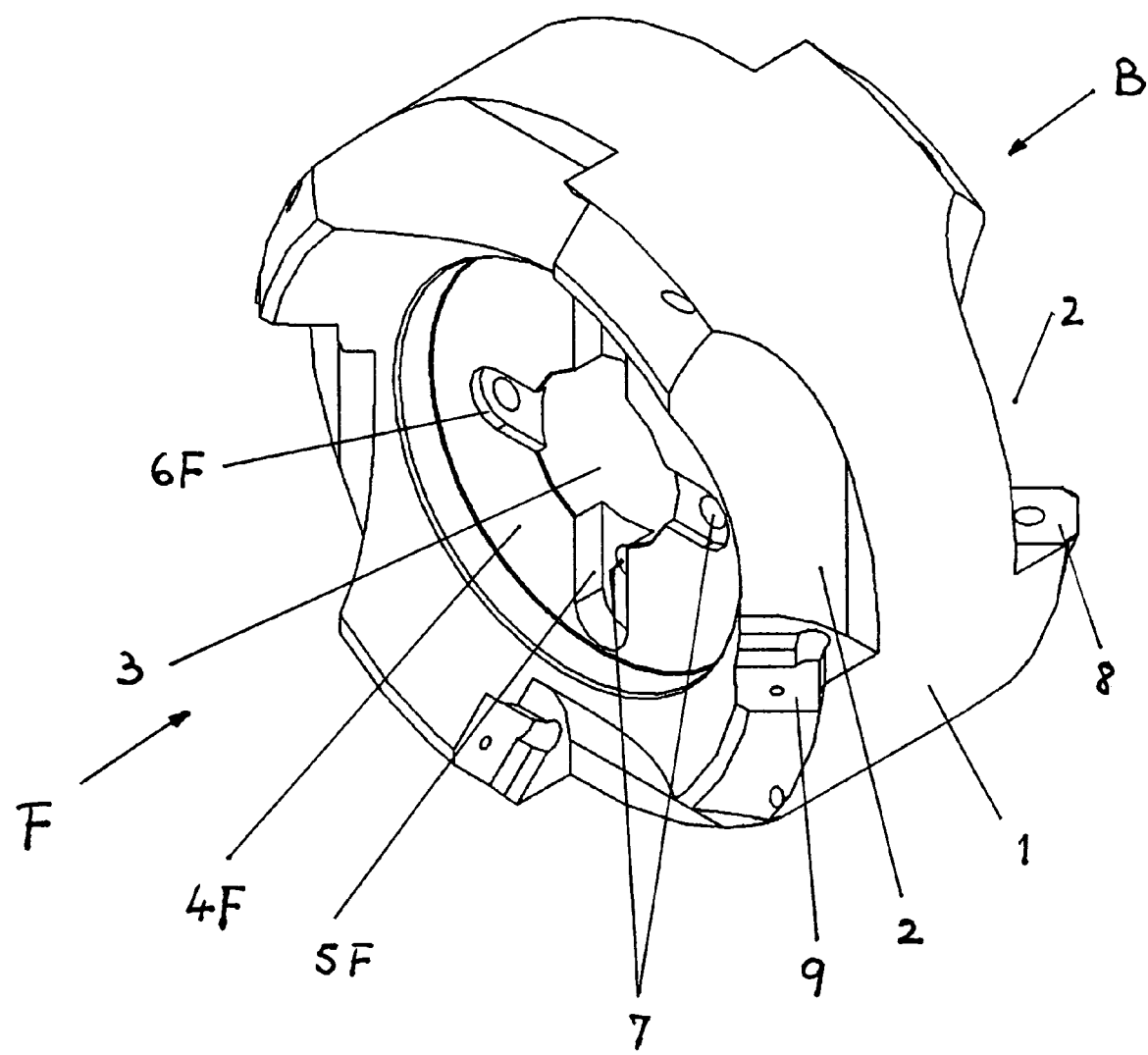
FIG. 1 is an isometric view of a specific embodiment of a milling cutter with two milling heads of the invention. One square-like insert is placed on the insert seat of the back milling head.

According to FIG. 1 a milling cutter comprises a basic body 1 with chip pockets 2 at its periphery on both sides of its two cutting faces. It has e.g. square-like indexable inserts 8 (only one is shown) which can be affixed by means of screws (not shown) on the insert seat 9 of the chip pocket 2. Further it has a unique central hole 3 which is cut through the body 1 to receive the journal of a shell mill holder. More specifically it has a central bore 4F at its front side F and a central bore 4B at its back side B as well. The two central bores 4F and 4B are mirror symmetrically turned off in the body 1 in respect to a mid plan. (see FIG. 2).

According to this embodiment of body the basic and usual key grooves 5F and 5B are formed on the bottom of each central bore 4F and 4B. The both key grooves are arranged perpendicular to each other as show FIG. 1 and 2. They are deep and long enough in the design to receive a pair of shell mill keys of a holder (not showed). Besides the bottom of each central bore 4F and 4B presents four small holes drilled through in the body 1 for inner coolant. For this coolant purpose a pair of coolant grooves 6F and 6B is cut on the bottom of each central bore 4F and 4B preferably perpendicularly to the key grooves 5F and 5B respectively. These coolant grooves are short enough to be covered entirely by the drive head of a shell mill holder with inner coolant tubes.

FIG. 1 shows as reference one square-like insert mounted with positive rake angle on the insert seat of the back side B.

Figure 2:
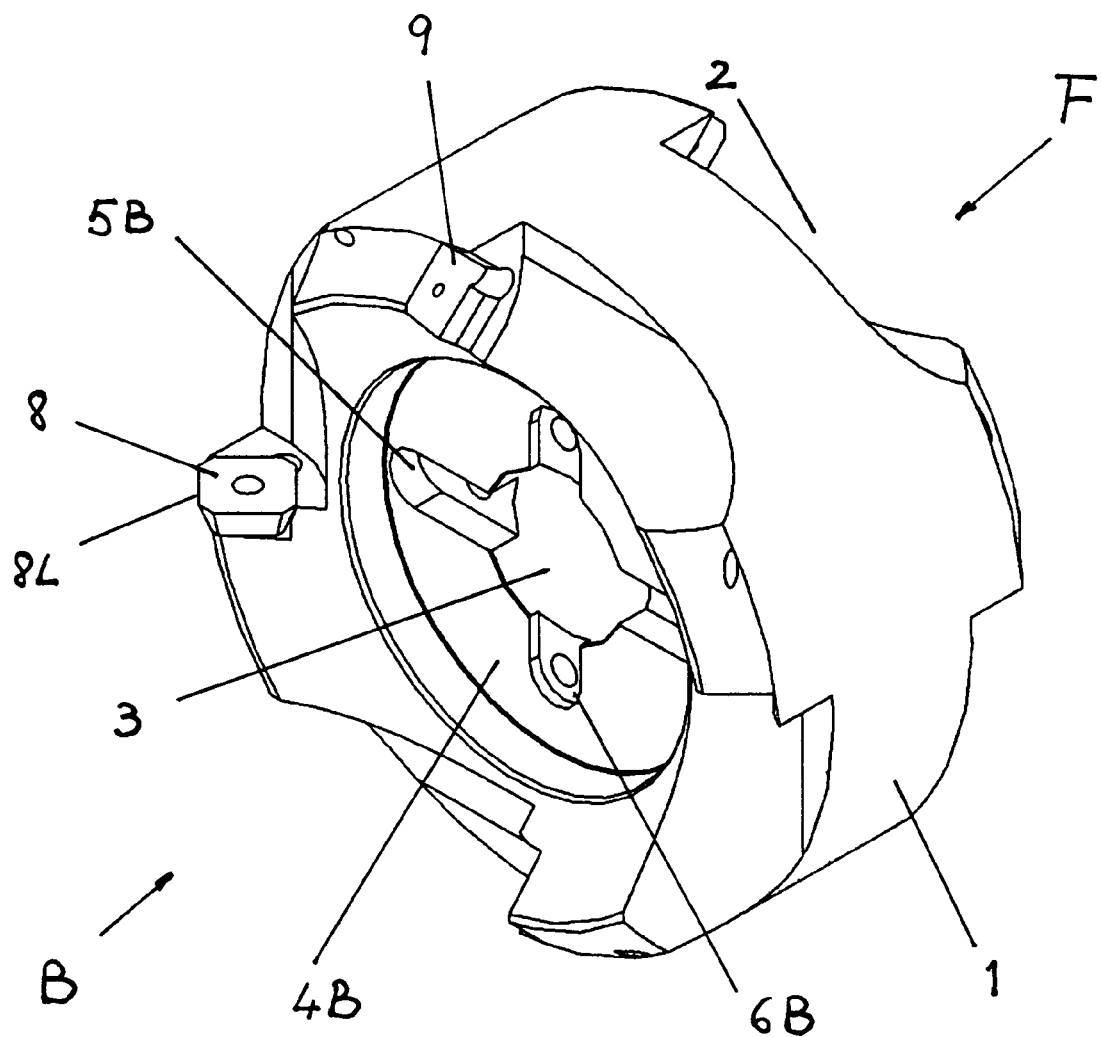
FIG. 2 is another isometric view of the same tool showing the back milling head in the front view. The same insert is on the same place as before.

FIG. 2 shows the body 1 with the same insert 8 after turning over 180 degrees about a vertical axis.

Figure 3:
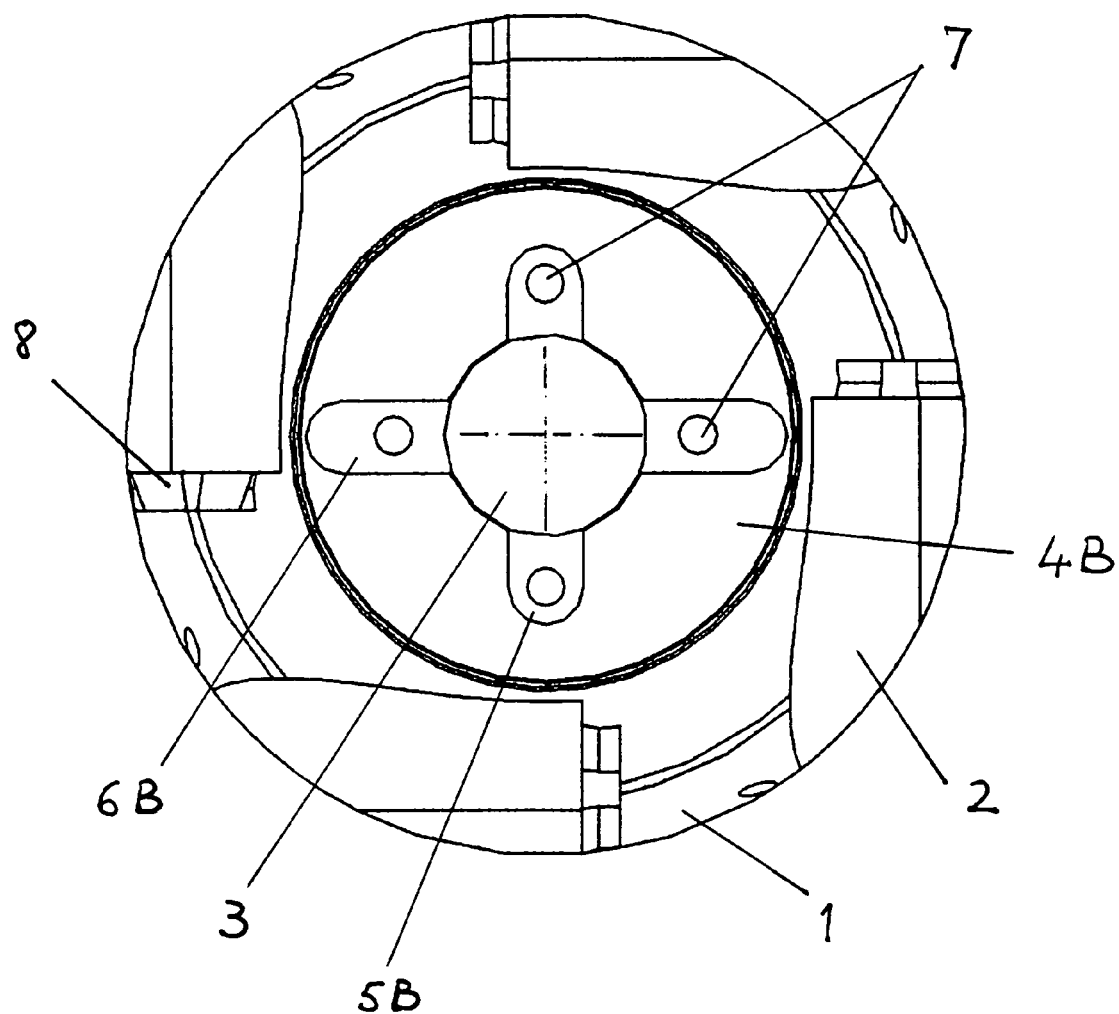
FIG. 3 is the front view of the back milling head.

FIG. 3 is the front view of FIG. 2. The key grooves and coolant grooves are formed on the bottom of the central bore 4F preferably perpendicular to each others.

As illustrated in all these drawings this embodiment of a milling cutter has rightly two operating faces for machining a workpiece. If a shell mill holder is mounted from the front side F of FIG. 2 a shell mill screw would be mounted on the central bore 4B of the back side B. The coolant would run out from the grooves 6F through the holes 7 towards the workpiece. The spindle would have to turn in the counter clockwise direction. The square-like insert 8 would cut the workpiece with its left cutting edge 8L. The depth of cut could be 0.070 to 0.125 Inch depending on the material hardness of the workpiece if the I.C of the insert is 0.5 Inch in a rough milling operation.

While the present invention illustrating a particular embodiment of milling cutter and an example of usable insert it will be appreciated that some modifications will occur to this art of tool, and it is intended in appended claims to cover all those eventual modifications which fall within the spirit and scope of the present invention.

I claim:

1. A milling cutter comprising:
   a unique tool body having on its both sides respectively one cutting head rotatable about the central axis;
   a central bore on each of these said cutting heads to receive the front face of a shell mill holder;
   a pair of key grooves on the bottom of each central bore to fit into the drive keys of a mill holder;
   a pair of coolant grooves on the bottom of each central bore containing respectively one hole drilled axially through the body.

2. The milling cutter defined in claim 1 wherein the square-like indexable inserts are affixed at the periphery of each cutting head with respect to the central axis.

* * * * *